US012691844B2

(12) United States Patent
Shin et al.

(10) Patent No.: US 12,691,844 B2
(45) Date of Patent: Jul. 28, 2026

(54) DRIVER SEAT AIRBAG DEVICE

(71) Applicant: HYUNDAI MOBIS CO., LTD., Seoul (KR)

(72) Inventors: Ji Soo Shin, Yongin-si (KR); Do Hyung Kim, Yongin-si (KR); Jung Won Kim, Yongin-si (KR); Sung Joon Ahn, Yongin-si (KR); Jun Lee, Yongin-si (KR); Hyun Jun An, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/232,827

(22) Filed: Jun. 9, 2025

(65) Prior Publication Data

US 2026/0175810 A1    Jun. 25, 2026

(30) Foreign Application Priority Data

Dec. 20, 2024    (KR) ........................ 10-2024-0192173

(51) Int. Cl.
| | |
|---|---|
| *B60R 21/2165* | (2011.01) |
| *B60K 35/22* | (2024.01) |
| *B60K 35/50* | (2024.01) |
| *B60K 35/60* | (2024.01) |
| *B60K 35/65* | (2024.01) |
| *B60R 21/203* | (2006.01) |

(52) U.S. Cl.
CPC ........ *B60R 21/21656* (2013.01); *B60K 35/22* (2024.01); *B60K 35/50* (2024.01); *B60K 35/60* (2024.01); *B60K 35/654* (2024.01); *B60R 21/203* (2013.01); *B60K 2360/782* (2024.01)

(58) Field of Classification Search
CPC ............. B60R 21/203; B60R 21/2035; B60R 21/21656; B60K 2360/782; B60K 35/50; B60K 35/60; B60K 35/654; B60K 35/22
See application file for complete search history.

(56) References Cited

U.S. PATENT DOCUMENTS

| | | | | |
|---|---|---|---|---|
| 5,110,647 | A * | 5/1992 | Sawada | ............. B60R 21/21656 428/43 |
| 6,099,027 | A | 8/2000 | Shirk et al. | |
| 7,441,801 | B2 * | 10/2008 | Nakamura | ............... B60Q 3/14 280/731 |
| 7,520,528 | B2 * | 4/2009 | Nakamura | ............. B60Q 5/003 280/731 |

(Continued)

FOREIGN PATENT DOCUMENTS

| | | | | |
|---|---|---|---|---|
| JP | 2014-61849 A | 4/2014 | | |
| KR | 20210060737 A | * | 5/2021 | ......... B60R 21/2035 |

(Continued)

OTHER PUBLICATIONS

Extended European Search Report issued on Oct. 23, 2025 in counterpart European Patent Application No. 25181922.3. (9 pages in English).

*Primary Examiner* — Laura Freedman
(74) *Attorney, Agent, or Firm* — NSIP Law

(57) ABSTRACT

A driver seat airbag device includes a cover including a window, with the cover being coupled to a steering wheel of a vehicle, a display module installed behind the cover to display information to a driver through the window, and an airbag assembly installed behind the display module.

9 Claims, 7 Drawing Sheets

(56)                References Cited

U.S. PATENT DOCUMENTS

| | | | | |
|---|---|---|---|---|
| 8,538,628 | B2 * | 9/2013 | Backman | B60K 35/658 |
| | | | | 701/36 |
| 8,939,467 | B2 * | 1/2015 | Zahn | B60R 21/2035 |
| | | | | 280/728.2 |
| 9,193,375 | B2 * | 11/2015 | Schramm | B60R 21/21658 |
| 10,144,383 | B2 * | 12/2018 | Bodtker | B60R 21/21656 |
| 10,166,914 | B2 * | 1/2019 | Jablonski | B60K 35/60 |
| 10,592,092 | B2 * | 3/2020 | Washeleski | B60K 35/22 |
| 10,857,884 | B2 * | 12/2020 | Derrick | G06F 3/14 |
| 11,072,301 | B2 * | 7/2021 | Klaenhammer | B62D 1/105 |
| 11,407,436 | B2 * | 8/2022 | Scheick | B62D 1/046 |
| 11,427,147 | B2 * | 8/2022 | Song | B60R 21/2176 |
| 11,511,696 | B2 * | 11/2022 | Song | B60R 21/2346 |
| 11,518,333 | B2 * | 12/2022 | Song | B60R 21/203 |
| 11,597,345 | B2 * | 3/2023 | Ko | B60R 21/21656 |
| 11,648,903 | B2 * | 5/2023 | Ko | B62D 1/04 |
| | | | | 280/728.2 |
| 11,661,023 | B2 * | 5/2023 | Song | B60R 21/203 |
| | | | | 280/728.2 |
| 11,945,390 | B2 * | 4/2024 | Von Roden | B60R 21/203 |
| 11,999,404 | B2 * | 6/2024 | Kwon | B60K 35/50 |
| 12,162,424 | B2 * | 12/2024 | An | B60R 21/263 |
| 2009/0189373 | A1 | 7/2009 | Schramm et al. | |
| 2025/0033476 | A1 * | 1/2025 | Pirkey | B60K 35/25 |
| 2025/0121791 | A1 * | 4/2025 | Amorim Correia | B60R 21/239 |
| 2025/0170894 | A1 * | 5/2025 | Lin | B60K 35/60 |

FOREIGN PATENT DOCUMENTS

| | | | | | |
|---|---|---|---|---|---|
| KR | 20210130318 | A | * | 11/2021 | B60R 21/237 |
| KR | 20210144139 | A | * | 11/2021 | B60R 21/2165 |
| KR | 20220026389 | A | * | 3/2022 | B60R 11/0229 |
| KR | 20220030690 | A | * | 3/2022 | B60R 11/0229 |
| KR | 20220030691 | A | * | 3/2022 | B60R 21/203 |
| KR | 20220043550 | A | * | 4/2022 | B60R 21/264 |
| KR | 20220046335 | A | * | 4/2022 | B60R 21/2176 |
| KR | 20220080541 | A | * | 6/2022 | B60R 21/2176 |

* cited by examiner

DRIVER SEAT AIRBAG DEVICE

CROSS REFERENCE TO RELATED APPLICATION

This application claims priority to and the benefit of Korean Patent Application No. 10-2024-0192173, filed on Dec. 20, 2024, in the Korean Intellectual Property Office, the entire disclosure of which is incorporated herein by reference in its entirety for all purposes.

BACKGROUND

1. Field of the Invention

The present invention relates to a driver seat airbag device.

2. Description of Related Art

Various types of airbag devices are provided in vehicles as a method of safely protecting passengers in the vehicles, and among them, a driver seat airbag device is installed in a steering wheel.

Meanwhile, when an autonomous driving situation, in which a vehicle travels to a destination by itself even when a driver does not directly manipulate a steering wheel, acceleration pedal, brake, and the like, is generally implemented, a relax mode in which the driver rests without directly conducting driving may be selected while the vehicle is traveling, and a display may be provided on the steering wheel to allow the driver to rest comfortably in the relax mode situation.

As described above, when both a display that a driver can view with the eyes and an airbag for protecting the driver are mounted on the steering wheel of the vehicle, in the conventional structure, the airbag is fixedly installed in a rim of the steering wheel, and then the display is mounted on a front surface of the airbag to face the driver.

Accordingly, when an accident occurs, although the airbag should deploy and protrude in front of the display and toward the driver, it is impossible for the airbag, which deploys in this case, to protrude while lacerating the display due to characteristics of a material of the display, and in particular, when the airbag breaks the display and protrudes, the broken display scatters to cause injury to the driver. Accordingly, there is a need to resolve this problem.

SUMMARY

The present invention is directed to providing a driver seat airbag device of which a driver protection function is further improved by deploying an airbag cushion of an airbag assembly that does not break a display when the airbag cushion inflates.

Objects of the present invention are not limited to the above-described objects, and objects which are not described above will be clearly understood by those skilled in the art through the following descriptions.

One aspect of the present invention provides a driver seat airbag device which includes a cover including a window, and being coupled to a steering wheel of a vehicle, a display module installed behind the cover to display information to a driver through the window, and an airbag assembly installed behind the display module.

The cover may include a first body exposed to the driver and a second body at least partially hidden by the first body and partially exposed, and in the first body, the window may be disposed as a region through which the second body is exposed.

The first body may include an upper part and a lower part that may be vertically separated, and the second body may be exposed through a separation space between the upper part and the lower part.

The cover may be formed with a double injection structure in which the first body is formed through primary injection, the second body is formed through secondary injection along with the first body, and the first body and the second body are integrated.

The first body may be formed of a first material, and the second body may be formed of a second material different from the first material.

The first body may be a primary injection part formed of a thermoplastic olefin (TPO) material, and the second body may be a secondary injection part formed of a transparent polycarbonate (PC) material.

The cover may include a hidden film covering the window, and the hidden film may be configured to hide the display when the display is in a non-operation state and display the information when the display operates.

The upper part and the lower part of the first body may each include a tear line, and when an airbag cushion of the airbag assembly inflates, the upper part and the lower part each may be configured to be torn along the respective tear line, the lower part may be opened downward with respect to the steering wheel, and the upper part may be opened upward with respect to the steering wheel along with the display module.

The display module may include an organic light-emitting diode (OLED) panel and a rear housing coupled to a rear inner surface of the cover to fix the OLED panel.

A bonding layer may be interposed between the OLED panel and the rear housing.

This Summary is provided to introduce a selection of concepts in a simplified form that are further described below in the Detailed Description. This Summary is not intended to identify key features or essential features of the claimed subject matter, nor is intended to be used as an aid in determining the scope of the claimed subject matter.

BRIEF DESCRIPTION OF THE DRAWINGS

FIG. 3 is a view illustrating components of the driver seat airbag device of FIG. 2;

FIG. 5 is a view illustrating an on state and an off state of a display module in the driver seat airbag device;

Figure 1:
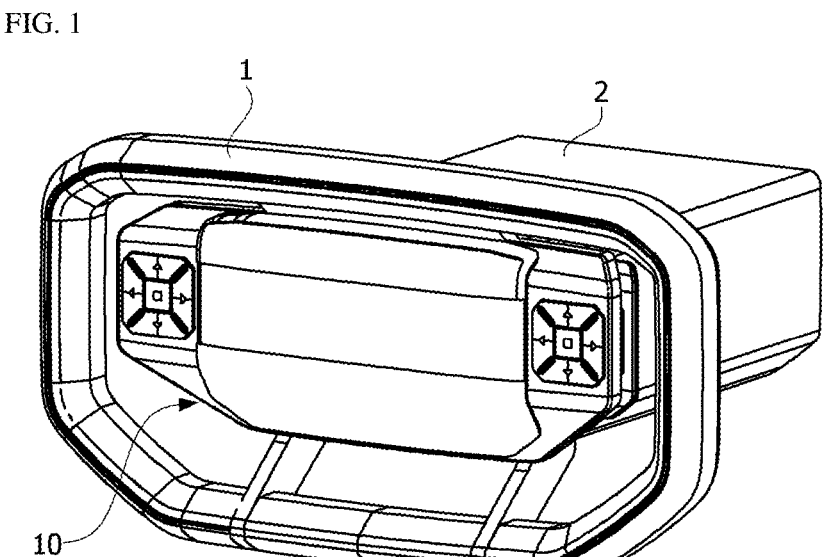
FIG. 1 is a view illustrating a steering wheel in which a driver seat airbag device is installed according to an embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
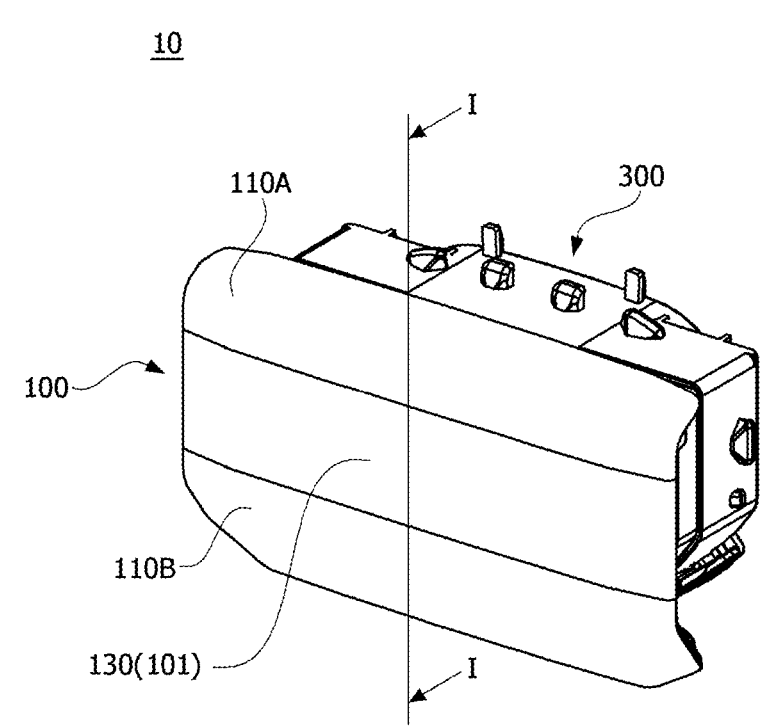
FIG. 2 is a view illustrating the driver seat airbag device according to the embodiment of the present invention.
Figure 3:
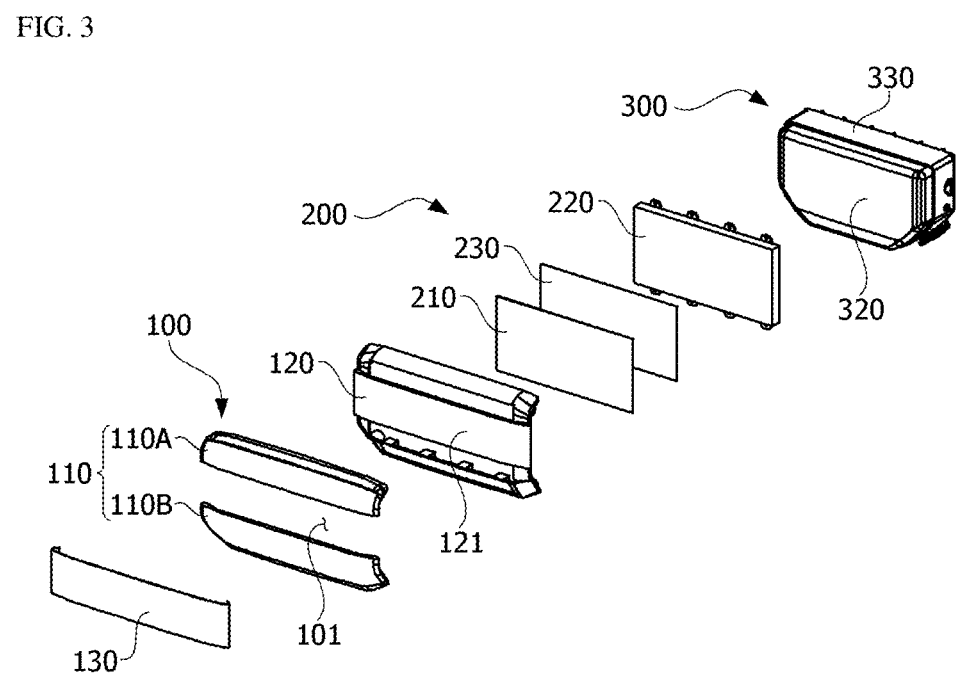
Figure 4:
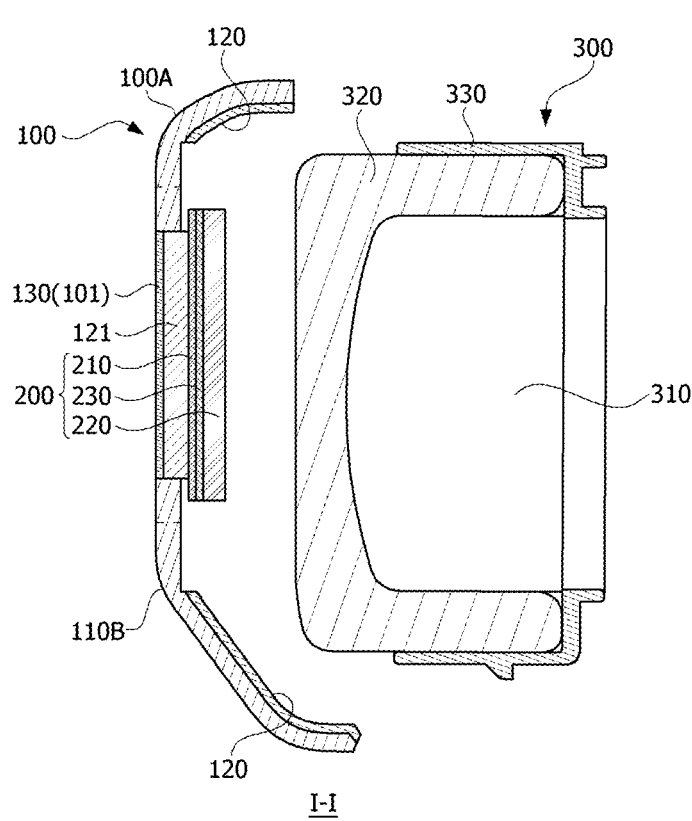
FIG. 4 is a cross-sectional view along line I-I in FIG. 2.
Figure 5:
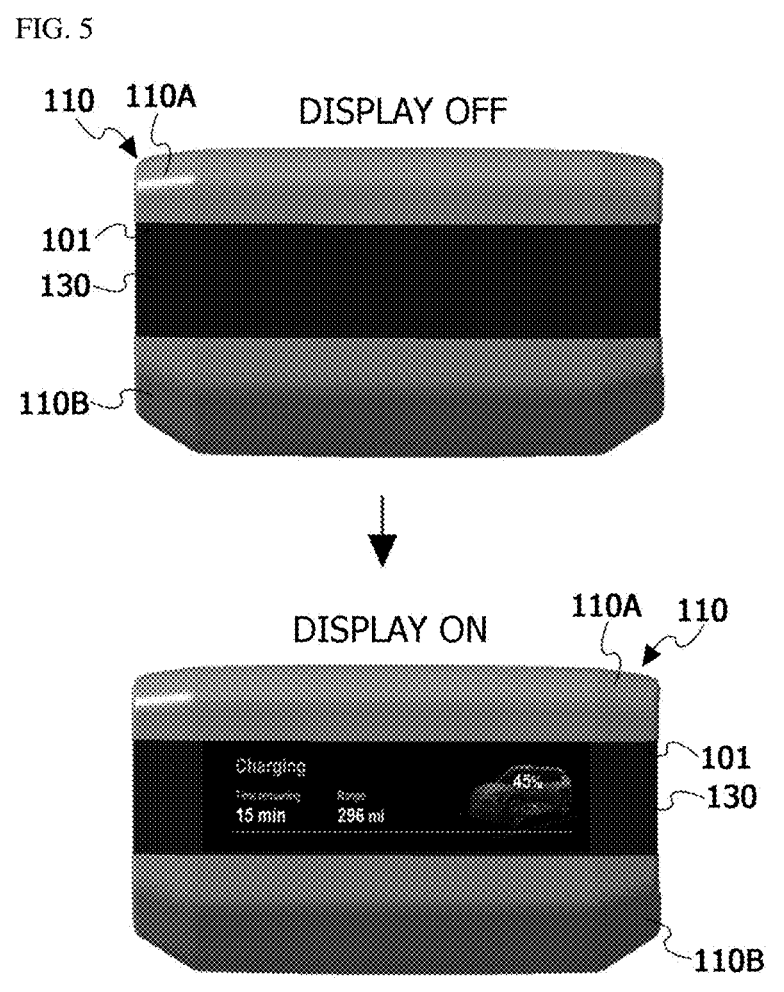
Figure 6:
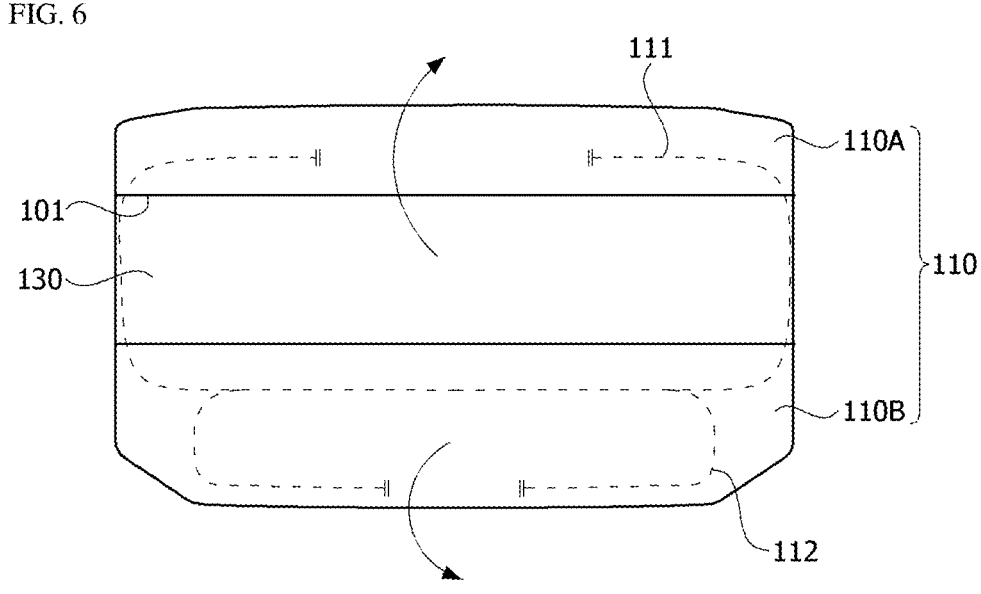
FIG. 6 is a view illustrating a tear line provided on a cover of the driver seat airbag device.
Figure 7:
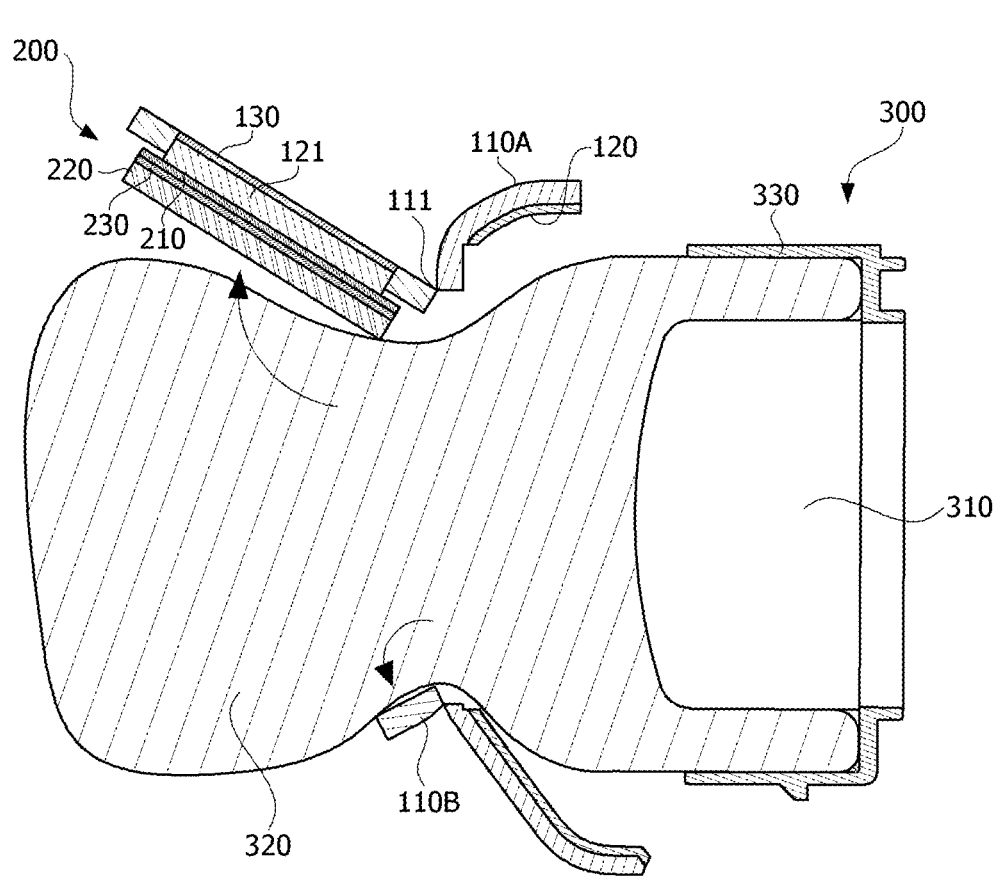
FIG. 7 is a view illustrating a state in which an airbag cushion deploys from the driver seat airbag device.

FIG. 1 is a view illustrating a steering wheel in which a driver seat airbag device is installed according to an embodiment of the present invention, and FIG. 2 is a view illustrating the driver seat airbag device according to the embodiment of the present invention. FIG. 3 is a view illustrating components of the driver seat airbag device of FIG. 2, and FIG. 4 is a cross-sectional view along line I-I in FIG. 2. FIG. 5 is a view illustrating an on state and an off state of a display module of the driver seat airbag device, and FIG. 6 is a view illustrating a tear line provided on a cover of the driver seat airbag device. FIG. 7 is a view illustrating a state in which an airbag cushion deploys from the driver seat airbag device.

Referring to the drawings, a driver seat airbag device 10 according to the embodiment of the present invention may be mounted in a steering wheel 1 of a vehicle.

The driver seat airbag device 10 according to the embodiment of the present invention may include a cover 100, a display module 200, and an airbag assembly 300. A structure, in which the display module 200 and the airbag assembly 300 are sequentially disposed in a state in which the cover 100 faces a driver, may be mounted.

The cover 100 may be coupled to the steering wheel 1 of the vehicle. The cover 100 may be disposed on a central portion of the steering wheel 1 and function as a horn cover or airbag cover.

The cover 100 may include a window 101. The window 101 may be provided as a structure extending from a substantially central region of the cover 100 in a left-right direction and vertically bisecting the cover 100. The display module 200 may be disposed behind the window 101 and allow the driver to view information provided by the display module 200 through the window 101.

The cover 100 may include a first body 110 and a second body 120.

The first body 110 may be exposed to the driver and include an upper part 110A and a lower part 110B which may be vertically separated.

The second body 120 may be hidden by the first body 110 and partially exposed. In this case, in the first body 110, the window 101 may be provided to be a region through which the second body 120 is exposed. That is, a central region 121 of the second body 120 is disposed and exposed through a separation space between the upper part 110A and the lower part 110B, and the central region 121 exposed through the separation space between the upper part 110A and the lower part 110B constitutes the window 101.

The central region 121 may be provided as a structure partially protruding from a front surface of the second body 120 toward the first body 110, and both end portions thereof in a longitudinal direction may be formed to be ruptured at the second body 120.

The first body 110 and the second body 120 may be formed of different materials. For example, the first body 110 may be formed of a first material which is an opaque, and the second body 120 may be formed of a second material which is transparent. For example, the first material may include thermoplastic olefin (TPO), and the second material may include polycarbonate (PC).

In the embodiment, the cover 100 may be formed with a double injection structure in which the first body 110 is formed through primary injection, the second body 120 is formed through secondary injection along with the first body 110, and the first body 110 and the second body 120 are integrated. That is, the first body 110 may be provided as a primary injection part formed of a TPO material, and the second body 120 may be provided as a secondary injection part formed of a transparent PC material.

As illustrated in FIG. 6, the upper part 110A and the lower part 110B may include tear lines 111 and 112, respectively. In this case, the tear line 111 provided on the upper part 110A and the tear line 112 provided on the lower part 110B may be provided to be connected to each other on the lower part 110B.

The cover 100 may further include a hidden film 130 for covering the window 101. The hidden film 130 may cover the second body 120 exposed between the upper part 110A and the lower part 110B of the first body 110.

As illustrated in FIG. 5, the hidden film 130 may be configured to hide the display module 200 when the display module 200 is in a non-operation state (off display) and to display information when the display module 200 is operating (on display). Accordingly, the driver may not recognize the display module 200 due to the hidden film 130 when the display module 200 is turned off and may view information when the display module 200 is turned on and the information is displayed through the hidden film 130. That is, a hidden display may be implemented using the hidden film 130.

In the embodiment, the hidden film 130 may be transferred to a surface of the second body 120 constituting the window 101 through in-mold formation. That is, the hidden film 130 may be in-mold formed integrally during a process of secondarily injection-molding the second body 120.

The display module 200 may be installed behind the cover 100 and provide information to the driver through the window 101. In the embodiment, the information may include battery capacity, battery charge information, a distance to empty of the vehicle, etc.

The display module 200 may include an organic light-emitting diode (OLED) panel 210 and a rear housing 220 which is coupled to a rear inner surface of the cover 100 to fix the OLED panel 210. In this case, a bonding layer 230 may be interposed between the OLED panel 210 and the rear housing 220 to more firmly restrict movement of the OLED panel 210.

The airbag assembly 300 may be installed behind the display module 200. In the embodiment, at the rear of the display module 200, the airbag assembly 300 may be fixedly coupled to the inside of a shroud 2.

The airbag assembly 300 may include an inflater 310, an airbag cushion 320, and an airbag housing 330.

The inflater 310 may be a disc type inflater having a structure of a substantially flat cylindrical shape. In addition, the inflater 310 may be fixed to the airbag housing 330 through a retainer (not shown).

The airbag cushion 320 may be formed to be inflated by air generated by the inflater 310 and accommodated in the airbag housing 330 in a folded state.

The airbag cushion 320 and the inflater 310 may be mounted in the airbag housing 330. The airbag housing 330 may be fixedly coupled to the shroud 2.

As illustrated in FIG. 7, when a collision accident of a vehicle occurs, the inflater 310 operates to generate air, and thus the airbag cushion 320 becomes inflated. When the airbag cushion 320 is inflated, the cover 100 is torn along the tear lines 111 and 112 due to inflation pressure, the lower part 110B of the first body 110 is opened downward with respect to the steering wheel 1, and the upper part 110A is opened upward with respect to the steering wheel 1 along with the display module 200.

Specifically, when the airbag cushion 320 is inflated by the inflater 310, the airbag cushion 320 is deployed toward the driver. In this case, the airbag cushion 320 applies a force (deployment pressure) to the display module 200 in front thereof, and the display module 200 applies a force to the cover 100 in front thereof. In addition, in the second body 120 of the cover 100, both end portions of the central region 121 are ruptured by such a force, and the first body 110 is torn along the tear lines 111 and 112 and opened.

The lower part 110B is opened downward with respect to the steering wheel 1 due to patterns of the tear lines 111 and 112, and the upper part 110A is opened upward with respect to the steering wheel 1 along with the hidden film 130, the central region 121 of the second body 120, and the display module 200. In addition, in a state in which the upper part 110A and the lower part 110B are opened, the airbag cushion 320 is deployed toward the driver in front thereof, and the driver is protected by the airbag cushion 320.

As described above, according to the present invention, when the airbag cushion 320 inflates in a structure in which the airbag assembly 300 is disposed behind the display module 200, the display module 200 is pushed and moved upward with respect to the steering wheel 1 along with the upper part 110A of the cover 100 opened upward with respect to the steering wheel 1. Accordingly, the display module 200 can be prevented from being broken, and the driver can be prevented from being injured by fragments scattered due to the broken display module 200.

In addition, since the window 101 through which the display module 200 disposed behind the cover 100 is displayed is provided, and the hidden film 130 is formed to cover the window 101, the hidden display can be implemented such that the display module 200 is hidden to be invisible usually and, when the display module 200 operates, the driver views information displayed through the hidden film 130. This has the effects of providing aesthetics and a good impression to the driver.

According to the present invention, a driver seat airbag device, of which a driver protection function is further improved by deploying an airbag cushion of an airbag assembly that does not break a display when the airbag cushion inflates, can be provided.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A driver seat airbag device comprising:
a cover including a window, and the cover being coupled to a steering wheel of a vehicle;
a display module installed behind the cover and configured to display information to a driver through the window; and
an airbag assembly installed behind the display module,
wherein the cover includes a hidden film covering the window, and
the hidden film is configured to hide the display module when the display module is in a non-operation state and display the information when the display module operates.

2. The driver seat airbag device of claim 1, wherein the cover further includes:

a first body exposed to the driver; and
a second body at least partially hidden by the first body and partially exposed,
wherein, in the first body, the window is disposed as a region through which the second body is exposed.

3. The driver seat airbag device of claim 2, wherein
the first body includes an upper part and a lower part that are vertically separatable, and
the second body is exposed through a separation space between the upper part and the lower part.

4. The driver seat airbag device of claim 3, wherein
each of the upper part and the lower part of the first body includes a tear line, and
when an airbag cushion of the airbag assembly inflates, the upper part and the lower part of the first body are each configured to be torn along the respective tear line, the lower part is opened downward with respect to the steering wheel, and the upper part is opened upward with respect to the steering wheel along with the display module.

5. The driver seat airbag device of claim 2, wherein the cover is formed with a double injection structure in which the first body is formed through primary injection, the second body is formed through secondary injection along with the first body, and the first body and the second body are integrated.

6. The driver seat airbag device of claim 5, wherein
the first body is formed of a first material, and
the second body is formed of a second material different from the first material.

7. The driver seat airbag device of claim 6, wherein
the first body includes a primary injection part formed of a thermoplastic olefin (TPO) material, and
the second body includes a secondary injection part formed of a transparent polycarbonate (PC) material.

8. The driver seat airbag device of claim 1, wherein the display module includes:
an organic light-emitting diode (OLED) panel; and
a rear housing coupled to a rear inner surface of the cover to fix the OLED panel.

9. The driver seat airbag device of claim 8, wherein a bonding layer is interposed between the OLED panel and the rear housing.

* * * * *